United States Patent [19]

Baumgartner et al.

[11] Patent Number: 4,879,623

[45] Date of Patent: Nov. 7, 1989

[54] VOLTAGE TRANSIENTS

[75] Inventors: Kenneth A. Baumgartner, Peoria, Ill.; William Pickering, University Heights, Ohio

[73] Assignee: Caterpillar Industrial Inc., Mentor, Ohio

[21] Appl. No.: 803,285

[22] Filed: Dec. 2, 1985

[51] Int. Cl.$^4$ .............................................. H02H 7/09
[52] U.S. Cl. ........................................ 361/33; 361/91; 361/86
[58] Field of Search ....................... 361/23, 33, 88, 89, 361/91, 86, 111; 363/46–48

[56] References Cited

U.S. PATENT DOCUMENTS

| | | | |
|---|---|---|---|
| 3,805,142 | 4/1974 | Rando | 361/91 X |
| 3,944,889 | 3/1976 | Conway | 361/89 |
| 3,950,675 | 4/1976 | Weber et al. | 361/33 X |
| 4,031,464 | 6/1977 | Norberg | 361/111 X |
| 4,040,117 | 8/1977 | Houser | 361/33 |
| 4,195,333 | 3/1980 | Hedel | 363/46 X |
| 4,247,888 | 1/1981 | Ängquist | 363/47 |
| 4,333,118 | 5/1982 | Comstedt et al. | 361/23 X |
| 4,355,342 | 10/1982 | Franzolini | 361/91 |
| 4,358,818 | 11/1982 | Rosa | 363/46 |
| 4,361,788 | 11/1982 | Melocik | 318/83 |
| 4,377,835 | 3/1983 | Asplund et al. | 361/89 X |
| 4,380,045 | 4/1983 | Ishii | 363/46 X |
| 4,437,133 | 3/1984 | Rueckert | 361/91 X |
| 4,466,071 | 8/1984 | Russell, Jr. | 361/89 X |
| 4,524,403 | 5/1985 | Seth | 361/91 X |
| 4,605,981 | 8/1986 | Hovet et al. | 361/91 |

Primary Examiner—A. D. Pellinen
Assistant Examiner—Anthony Wysocki
Attorney, Agent, or Firm—Stephen L. Noe

[57] ABSTRACT

Motor control systems having solid-state components are commonly used on industrial vehicles such as lift trucks. Such solid-state components are easily damaged by excessive transient voltages. The subject invention includes a power supply for supplying direct current to a motor circuit, wherein the direct current has a nominal direct current voltage value and as associated transient voltage component. A pulse control circuit supplies current pulses from the power supply to a motor. A sensing device controllably produces a fault signal in response to the amplitude and frequency of occurrence of the transient voltage component exceeding a predetermined maximum value. An override circuit receives the fault signal and responsively modifies the current pulses delivered from the power supply to the associated motor.

14 Claims, 2 Drawing Sheets

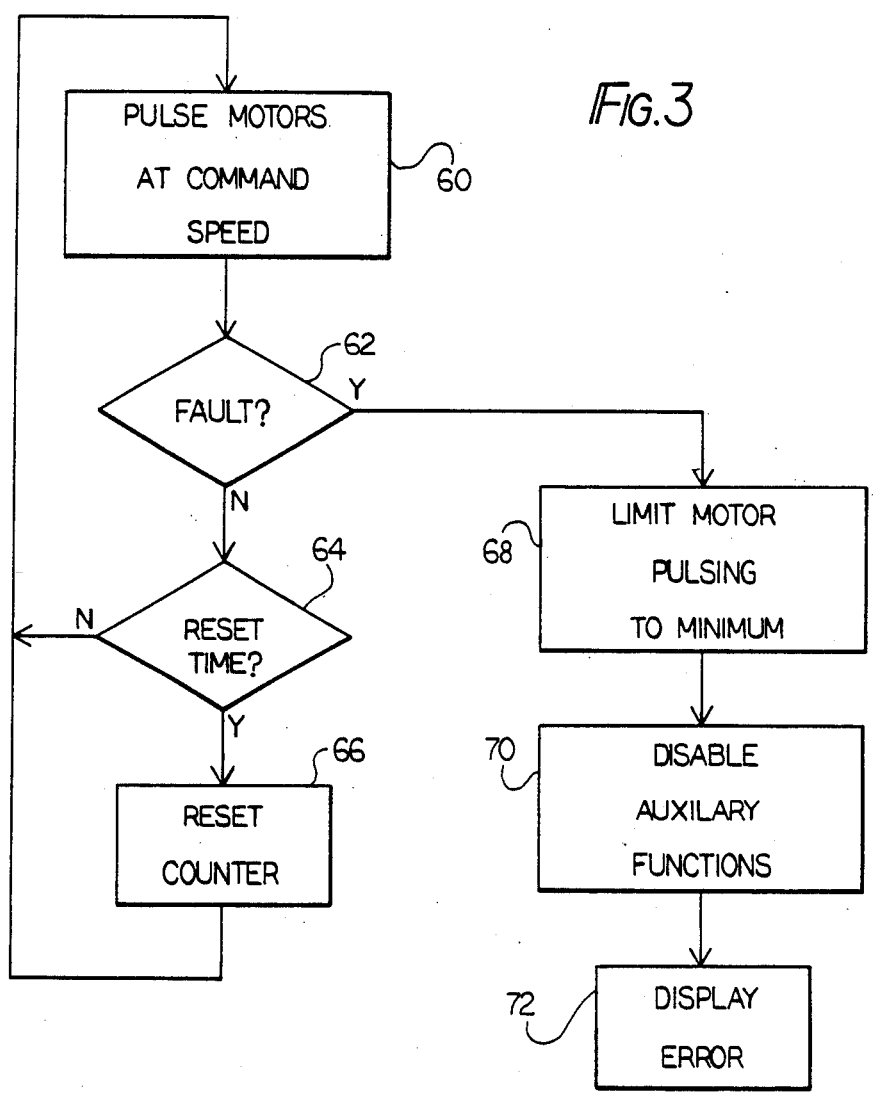

VOLTAGE TRANSIENTS

TECHNICAL FIELD

This invention relates generally to an apparatus and method for protecting an electrical circuit and, more particularly, to an apparatus and method for protecting a motor circuit from damage caused by variations in the nominal voltage level of electrical power supplied to the motor circuit.

BACKGROUND ART

Various types of electrically operated devices available today utilize solid-state circuit components. Such solid-state components are designed to be operated within specified voltage limits and are subject to damage when voltages outside of the specified range are applied.

An example of such an electrical circuit is the motor circuit associated with an electrical vehicle, for example, an industrial lift truck. Such motor circuits often include an electric motor connected across a direct current power supply, for example, a storage battery. Power is typically supplied to the motor through a solid-state current chopping device, such as a transistor or thyristor. In addition to the motor, various other electrical devices are frequently connected across the power supply.

Although the nominal voltage delivered from the direct current power supply is substantially constant, operation of the various other connected devices can cause the actual voltage of the power supply to vary about the nominal magnitude. Such transient variation in power supply voltage are commonly referred to as "ripple", and are particularly undesirable when such ripple or transient voltages exceed the voltage limits of the associated motor circuit solid state components.

Recognizing that damage can result from excessive power supply transient voltages, manufacturers have devised methods of maintaining the peak transient voltage within safe limits. Most common is the use of a head capacitor connected across the power supply in parallel with the associated components. The value of the head capacitor is determined by the circuit in question, and is such that the head capacitor is able to resist instantaneous changes in the nominal power supply voltage, or, at least, is able to maintain the magnitude of such changes within prescribed bounds.

The use of a head capacitor has been found to satisfactorily counter the transient voltage problem. However, head capacitors often fail when used in an industrial environment. The capacitors are subjected to extremes of temperature and vibration, and often either fail catastrophically or gradually change in essential characteristics over a period of time. Such failure allows transient voltages to exceed the safe limits established, and often results in catastrophic failure of the various solid state components associated with the motor circuit.

The present invention is directed to overcoming one or more of the problems as set forth above.

DISCLOSURE OF THE INVENTION

In one aspect of the present invention, an apparatus for protecting a motor circuit from damage caused by variations in the nominal voltage level of electrical power supplied to the motor circuit is provided. The apparatus includes a power supply for supplying direct current having a nominal voltage value to the motor circuit. The supplied direct current includes an associated transient voltage component. A voltage smoothing element limits the amplitude of the transient voltage component to a predetermined maximum value relative to the nominal direct current voltage value. A motor is connected across the power supply and a pulse control circuit delivers current pulses from the power supply to the motor. A sensing device controllably produces a fault signal in response to the amplitude of the transient voltage component exceeding the predetermined maximum value, and an override device receives the fault signal and responsively modifies the current pulses delivered from the pulse control circuit.

In a second aspect of the present invention, an apparatus for protecting a motor circuit from damage caused by a defective head capacitor is provided. The apparatus includes a power supply for supplying electrical power to the motor circuit, and a head capacitor and motor connected across the power supply. A pulse control circuit delivers current pulses from the power supply to the motor. A sensing device controllably produces a fault signal in response to a fault condition of the head capacitor, and an override device receives the fault signal and responsively modifies the current pulses delivered from the pulse control means.

In a third aspect of the present invention, a method for monitoring a head capacitor in a motor circuit is provided. The motor circuit includes a source of electrical power, a motor and head capacitor connected in parallel across the power source, and a pulse control circuit adapted to controllably deliver current pulses from the power source to the motor. The method includes the steps of continuously sensing the magnitude of the transient voltage across the head capacitor and producing a trigger signal in response to each time the transient voltage exceeds a predetermined magnitude. The trigger signals are received and a fault signal is produced in response to receiving at least a predetermined plurality of the trigger signals during a predetermined period of time. The fault signal is received and the current pulses delivered by the pulse control circuit from the power source to the motor are responsively controllably modified.

BRIEF DESCRIPTION OF THE DRAWINGS

For a better understanding of the present invention, reference may be made to the accompanying drawings, in which:

FIG. 3 is a flowchart of software used with one embodiment of the present invention.

BEST MODE FOR CARRYING OUT THE INVENTION

Figure 1:
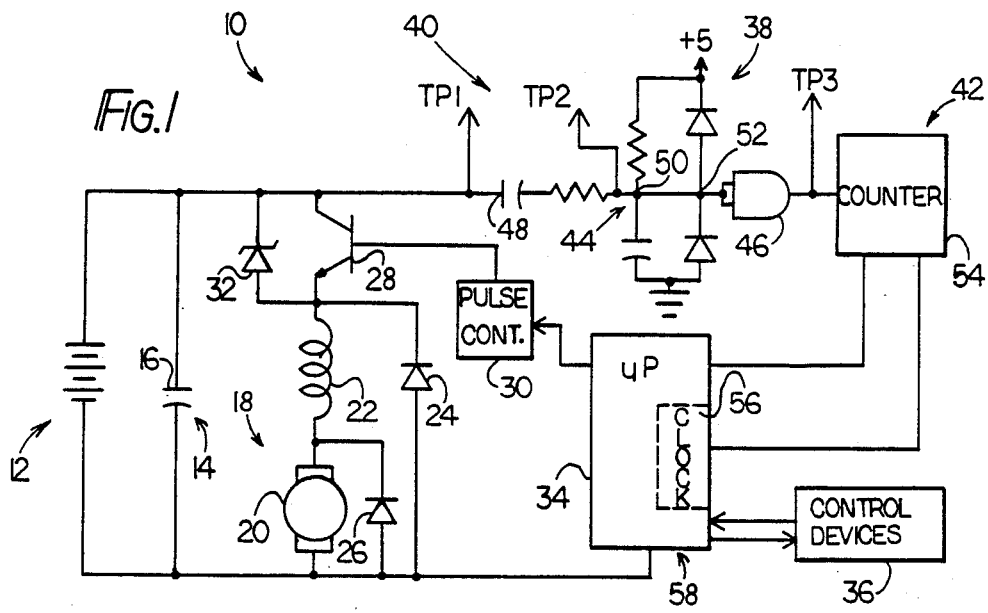
FIG. 1 is a schematic diagram of an electrical circuit incorporating an embodiment of the present invention.

Referring first to FIG. 1, an apparatus embodying certain of the principals of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

A power supply means 12 supplies direct current to the motor circuit. The direct current has a nominal direct current voltage value and an associated transient voltage component. The power supply means 12 is, for example, a storage battery associated with the motor circuit.

A smoothing means 14 limits the amplitude of the transient voltage component to a predetermined maximum value relative to the nominal direct current voltage value of the power supply means 12. In the preferred embodiment, the smoothing means 14 includes a head capacitor 16 connected across the power supply means 12.

A motor 18 is connected across the power supply means 12. The motor includes, for example, a series connected armature 20 and field 22, and has associated with it a flyback diode 24 and a plugging diode 26. The motor 18 is connected in series with a power transistor 28, which is included in a pulse control means 30 for delivering time modulated current pulses from the power supply means 12 to the motor 18. A transient protection device 32 is connected in parallel with the transistor 28. The pulse control means 30 is, for example, a conventional transistorized chopping circuit of the type often used for controlling motor speed.

The pulse control means 30 is connected to a motor control unit including a microprocessor 34 associated with various control devices 36. The control devices 36 can consist of various elements, for example, a speed command unit, additional motor circuits similar to the one described above, and various other circuits associated with the overall device of which the motor circuit comprises one portion, for example, an industrial lift truck. The various elements making up the control device 36 are of no consequence to the instant invention and are not further described herein. Likewise, the use of a microprocessor is discussed for exemplary purposes only, and a circuit composed of discreet components can be substituted therefor.

A sensing means 38 controllably produces a fault signal in response to the amplitude of the transient voltage component exceeding the predetermined maximum value. The sensing means 38 includes a logic means 40 for producing a trigger signal each time the amplitude of the transient voltage component exceeds the predetermined maximum value, and a discriminator means 42 for receiving the trigger signals and producing the fault signal only in response to receiving a predetermined plurality of the trigger signals within a predetermined period of time.

The logic means 40 includes a signal conditioning means 44 for producing a logic level signal responsive to the transient voltage component. The logic means 40 also includes a logic gate 46 having an input terminal connected to the signal conditioning means 44 and an output terminal connected to the discriminator means 42. The signal conditioning means 44 includes a decoupling capacitor 48 connected to the head capacitor 16, a voltage divider 50 connected to the decoupling capacitor 48, and a rectifier circuit 52 connected to the voltage divider 50 and to the logic gate 46 input terminal. The voltage divider 50 is connected between the decoupling capacitor 48 and positive supply voltage, and the rectifier circuit 52 is connected between positive supply voltage and circuit ground.

The discriminator means 42 includes a counter 54 having a fault output terminal, a reset input terminal, and a count input terminal connected to the logic gate 46 output terminal. A clock means 56 is connected to the counter 54 reset input terminal for controllably periodically resetting the counter 54.

An override means 58 receives the fault signal and responsively modifies the time modulated current pulses delivered from the pulse control means 30. In the preferred embodiment, the override means 58 includes the programmed microprocessor 34, and the clock means 56 is implemented within the microprocessor 34.

Referring now to FIG. 3, a flowchart of software used with the microprocessor 34 is illustrated. It will be appreciated by those skilled in the art that it is not essential to incorporate all of the steps represented in the flowchart of FIG. 3 in a particular system, nor is it necessary to implement the steps of FIG. 3 in a microprocessor. However, such an implementation is deemed to be the best mode of practicing the invention, owing particularly to the broad and widespread availability of microprocessor circuits, the common understanding of programming techniques for microprocessors, the relatively low cost of integrated circuitry, and the flexibility afforded by a programmable device. It will also be appreciated that, while the best mode of the invention is considered to include a properly programmed microprocessor, the result of which is the creation of novel hardware associations within the microprocessor and its associated devices, it is possible to implement the instant invention utilizing traditional hard wired circuits.

Beginning at the block 60, the motor 18 is pulsed at a speed commanded, for example, by the control device 36. The fault output terminal of the discriminator means 42 is repeatedly monitored or scanned for the presence of a fault signal. A fault signal on the fault output terminal indicates that, for example, three trigger signals have been received at the count input terminal of the discriminator means 42. If the fault signal is not received at the block 62, program control passes to the block 64 where it is determined whether or not the predetermined reset period has expired. If not, program control returns to the beginning block 60 of the flowchart, and the loop is repeated. Alternatively, if the reset period is found to have expired, program control passes to the block 66 where the counter 54 is reset by a pulse from the clock portion of the microprocessor 34. Subsequently, program control passes back to the block 60.

If, in the block 62, the fault signal is detected, indicating that three trigger signals have been received between reset pulses, program control passes to the right side of the flowchart where appropriate control actions are exercised. For example, in the block 68, motor current pulses from the pulse control means 30 are limited to a predetermined value. In the block 70, the microprocessor 34 can disable various auxiliary functions within the control device 36. Finally, in the block 72, an error condition can be displayed on an appropriate display device associated with the control device 36.

Industrial Applicability

Figure 2:
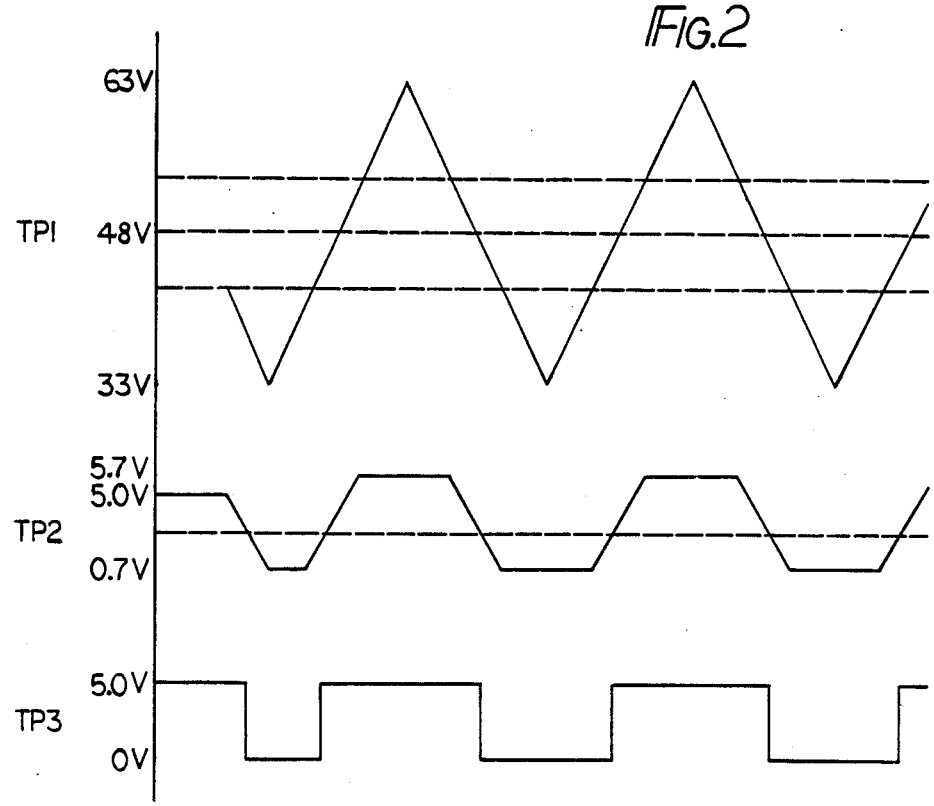
FIG. 2 is a plurality of electrical waveforms associated with an operating condition of the embodiment of FIG. 1.

Operation of the apparatus 10 is best described in relation to its use with a motor circuit of a vehicle, for example, an industrial vehicle such as an electric lift truck. Reference to FIGS. 1 and 2 throughout this discussion will be particularly helpful, as the various waveforms shown in FIG. 2 are respectively associated with test points 1-3 called out in FIG. 1.

In a typical motor circuit, the power supply means 12 provides a substantially continuous supply of direct current to the rest of the circuit. The nominal voltage of the direct current supplied from the power supply 12 is undesirably modulated by the occurrence of various events associated with components connected to the power supply. For example, pulsing of the motor 18 causes a transient voltage to be superimposed on the battery supply voltage. The transient voltage has a peak-to-peak value responsive to the amount of current required for operation of the motor, and has a frequency corresponding to the pulse frequency of the power transistor 28. Other devices connected to the power source 12 produce additional, transient voltage components.

Assuming that a given command speed from the control device 36 causes the pulse control 30 to deliver current pulses to the transistor 28 at a frequency of 500 Hz, the transient frequency voltage component will also be evidenced at a frequency of 500 Hz, as shown at TP1 in FIG. 2. Knowing the design parameters of a particular motor circuit, the head capacitor 16 is readily selected to have a value sufficient to maintain the transient current voltage component within a predetermined peak-to-peak amplitude range. For example, if it is desired that the peak-to-peak amplitude be maintained at 14 volts or below, as indicated by the broken lines on either side of the 48 volt line at TP1, a suitable head capacitor value can be calculated. So long as the head capacitor is operating properly, the peak amplitude relative to the 48 volt nominal power supply voltage does not extend beyond 55 volts or below 41 volts.

The transient voltage component is coupled through the decoupling capacitor 48 to the voltage divider circuit 50 and rectifier circuit 52. The combination of the voltage divider circuit 50 and the rectifier circuit 52 is sufficient to provide a transient voltage signal that falls within a voltage range suitable for application to the CMOS logic gate 46. Since the voltage at which the CMOS logic gate 46 switches is typically 50% of the circuit supply voltage, assumed to be 5 volts DC in this case, the signal delivered to the input terminal of the logic gate 46, under normal operating conditions, is insufficient to cause the logic state of the output terminal of the logic gate 46 to change. Responsively, no trigger signal is delivered at TP3 to the counter 54 and no fault signal is produced.

Assuming that the head capacitor 16 begins to fail, the amplitude of the transient voltage component begins to exceed the plus and minus seven volt acceptable rage. This is the condition shown by the solid waveform at TP1. The signal at TP1 is coupled through the decoupling capacitor 48 to the signal conditioning circuit 44, where it is modified by the voltage divider 50 and rectifier circuit 52. The resulting logic level signal is applied to the input terminal of the logic gate 46, and is now sufficient to cause the logic gate 46 to switch at each cycle of the transient voltage component. The waveform shown at TP3 represents the resulting trigger signal delivered from the logic gate 46, with each negative going transition of the trigger signal representing a "count" input to the counter 54. The counter 54 is a conventional counter chip, for example, part No. MCP14024 manufactured by Motorola, and delivers an output signal each time three trigger signals are received without an intervening reset.

Therefore, following receipt of three trigger signals, a fault signal is delivered from the fault output terminal of the counter 54 to the override means 58. Responsively, the override means 58 reduces the duration of the current pulses delivered to the motor 18, and takes other appropriate action through the control device 36.

In the case of a properly operating head capacitor 16, it is possible that occasionally the transient voltage component will exceed the predetermined acceptable range. For example, another device associated with the control device 36 can cause an instantaneous deviation in the transient nominal voltage on an isolated basis. Responsively, a trigger signal is produced at TP3 and delivered to the counter 54. However, assuming that three trigger signals are not delivered in rapid succession, the counter 54 does not produce the fault signal, owing to the fact that the counter 54 is periodically reset by the clock means 56, for example, every 10 milliseconds. Therefore, an occasional spurious trigger signal is cleared from the counter 54 and is disregarded. In other words, the counter 54 acts as a digital filter, eliminating the effect of trigger signals occurring in pluralities of less than three within a predetermined period.

The duration of the interval between reset pulses from the clock means 56 is selected in conjunction with the minimum expected transient frequency of the transient voltage component. Using the example of a pulse frequency having a minimum value of 500 Hz, the maximum pulse period is 2 milliseconds. If it is desired that at least three trigger pulses be required before a fault condition is presumed, it will take at least 6 milliseconds for the transient caused by operation of the motor 18 to produce the three trigger pulses. Therefore, a reset interval greater than 6 milliseconds must be provided. The ten millisecond reset period used in the example above meets this requirement and insures that an occasional deviation in supply voltage exceeding the acceptable limit will not cause a false fault indication, but that a failed head capacitor will always be detected within a relatively small number of cycles of operation.

The apparatus described above is easily adapted to various motor circuits, especially those including a programmable processor such as the microprocessor 34. Only a relatively small number of inexpensive components are required to provide protection against excessive transient voltages, typically caused by failure of a smoothing means 14 such as the head capacitor 16.

Other aspects, objects, advantages, and uses of this invention can be obtained from a study of the drawings, the disclosure, and the appended claims.

We claim:

1. Apparatus which protects an electrical circuit from damage caused by variations in the nominal voltage level of electrical power supplied to the electrical circuit, the electrical circuit including a motor circuit, comprising:

power supply means for supplying direct current to said motor circuit, said direct current having a nominal direct current voltage value and as associated transient voltage component;

smoothing means for limiting the amplitude of said transient voltage component to a predetermined maximum value relative to said nominal direct current voltage value;

a motor connected across said power supply means;

pulse control means for delivering time modulated current pulses from said power supply means to said motor;

sensing means for controllably producing a fault signal in response to the amplitude and frequency of occurrence of said transient voltage component exceeding predetermined maximum values; and override means for receiving said fault signal and responsively modifying said time modulated current pulses delivered from said pulse control means.

2. Apparatus, as set forth in claim 1, wherein said smoothing means includes a head capacitor connected in parallel with said motor across said power supply means.

3. Apparatus, as set forth in claim 2, wherein said sensing means includes logic means for producing a trigger signal each time the amplitude of said transient voltage component exceeds said predetermined maximum value, and discriminator means for receiving said trigger signals and producing said fault signal only in response to receiving a predetermined plurality of said trigger signals within a predetermined period of time.

4. Apparatus, as set forth in claim 3, wherein said logic means includes signal conditioning means for producing a logic level signal responsive to said transient voltage component.

5. Apparatus, as set forth in claim 4, wherein said logic means includes a logic gate having an input terminal connected to said signal conditioning means and an output terminal connected to said discriminator means.

6. Apparatus, as set forth in claim 5, wherein said discriminator means includes a counter having a count input terminal connected to said logic gate output terminal, and a fault output terminal connected to said override means.

7. Apparatus, as set forth in claim 6, including clock means for controllably periodically resetting said counter.

8. Apparatus, as set forth in claim 6, wherein said signal conditioning means includes a decoupling capacitor having an input and an output terminal, said input terminal being connected to said head capacitor, a voltage divider having an input and an output terminal, said voltage divider input terminal being connected to said decoupling capacitor output terminal, and a rectifier circuit having an input terminal and an output terminal, said rectifier input terminal being connected to said voltage divider output terminal and said rectifier output terminal being connected to said logic gate input terminal.

9. Apparatus which protects a motor circuit from damage caused by a defective head capacitor, comprising:

power supply means for supplying electrical power to said motor circuit;

a head capacitor connected across said power supply means and adapted to block transient voltages from said supplied electrical power;

a motor connected across said power supply means;

pulse control means for delivering time modulated current pulses from said power supply means to said motor;

sensing means for controllably producing a fault signal in response to said head capacitor failing to block said transient voltages; and override means for receiving said fault signal and responsively modifying said time modulated current pulses delivered from said pulse control means.

10. Apparatus, as set forth in claim 9, wherein said sensing means includes discriminator means for producing said fault signal only in response to detecting a predetermined plurality of said transient voltages within a predetermined period of time.

11. Apparatus, as set forth in claim 10, wherein said sensing means includes a signal conditioning circuit having an output terminal and an input terminal connected to said head capacitor, a logic gate having an output terminal and an input terminal connected to said signal conditioning circuit output terminal, and a counter having a reset terminal, a count input terminal connected to said logic gate output terminal, and a fault output terminal connected to said override means.

12. Apparatus, as set forth in claim 11, wherein said signal conditioning means includes a decoupling capacitor having an input and an output terminal, said input terminal being connected to said head capacitor, a voltage divider having an input and an output terminal, said voltage divider input terminal being connected to said decoupling capacitor output terminal, and a rectifier circuit having an input terminal and an output terminal, said rectifier input terminal being connected to said voltage divider output terminal and said rectifier output terminal being connected to said logic gate input terminal.

13. Apparatus, as set forth in claim 11, including clock means for producing a periodic reset pulse, said clock means being connected to said counter reset terminal.

14. A method for monitoring a head capacitor in a motor circuit, said motor circuit including an electrical power source, a motor and head capacitor connected in parallel across said power source, and pulse control means for controllably delivering current pulses from said power source to said motor, comprising the steps of:

continuously sensing the magnitude of transient voltage across said head capacitor;

producing a trigger signal in response to each time said transient voltage exceeds a predetermined magnitude;

receiving said trigger signals and producing a fault signal in response to receiving at least a predetermined plurality of said trigger signals during a predetermined period of time; and receiving said fault signal and responsively controllably modifying the current pulses delivered by said pulse control circuit from said power source to said motor.

* * * * *

UNITED STATES PATENT AND TRADEMARK OFFICE
CERTIFICATE OF CORRECTION

PATENT NO. : 4,879,623

DATED : November 7, 1989

INVENTOR(S) : Kenneth A. Baumgartner and William Pickering

It is certified that error appears in the above-identified patent and that said Letters Patent is hereby corrected as shown below:

Claim 1, line 8 of claim, delete "as" and insert --an--.

Signed and Sealed this

Thirteenth Day of November, 1990

Attest:

HARRY F. MANBECK, JR.

*Attesting Officer*      *Commissioner of Patents and Trademarks*